(12) United States Patent
Milne

(10) Patent No.: US 7,807,052 B2
(45) Date of Patent: Oct. 5, 2010

(54) APPARATUS FOR BUOYANCY DRIVEN FILTRATION

(76) Inventor: John D. Milne, 76 Slanley Tr., Taringa, Brisbane, Queensland (AU) 4068

( * ) Notice: Subject to any disclaimer, the term of this patent is extended or adjusted under 35 U.S.C. 154(b) by 112 days.

(21) Appl. No.: 12/263,097

(22) Filed: Oct. 31, 2008

(65) Prior Publication Data

US 2010/0065488 A1    Mar. 18, 2010

(51) Int. Cl.
*B01D 35/05* (2006.01)
*B01D 33/01* (2006.01)

(52) U.S. Cl. .................. 210/122; 210/242.1; 210/359; 210/433.1; 210/455; 210/473

(58) Field of Classification Search .............. 210/122, 210/242.1, 282, 359, 433.1, 446, 455, 473
See application file for complete search history.

(56) References Cited

U.S. PATENT DOCUMENTS

| | | | | |
|---|---|---|---|---|
| 717,932 A | * | 1/1903 | Scudder | 210/242.1 |
| 1,822,452 A | * | 9/1931 | Pelletier | 210/242.1 |
| 2,957,579 A | * | 10/1960 | McCombie | 210/242.1 |
| 3,395,803 A | * | 8/1968 | Sumimoto et al. | 210/122 |
| 3,442,385 A | * | 5/1969 | Nash | 210/122 |
| 3,756,410 A | * | 9/1973 | Moody et al. | 210/242.1 |
| 6,660,170 B2 | * | 12/2003 | Dreyer et al. | 210/242.1 |
| 6,841,067 B1 | * | 1/2005 | Hofmann et al. | 210/282 |
| 6,969,460 B2 | * | 11/2005 | Bertram | 210/433.1 |
| 2005/0218049 A1 | * | 10/2005 | Happel | 210/242.1 |
| 2008/0164223 A1 | * | 7/2008 | Wilson | 210/242.1 |

* cited by examiner

*Primary Examiner*—Christopher Upton
(74) *Attorney, Agent, or Firm*—Donald J. Ersler

(57) ABSTRACT

An apparatus for buoyancy driven filtration includes a tank and a filter assembly. The tank preferably includes a cylindrical sidewall, a circular base and a roof. The sidewall extends upward from the perimeter of the base wall and the roof extends across the top of the sidewall. A travel stop extends downward from the roof. A liquid feedstock flows through a storm water inlet. At least one overflow port is provided through the sidewall. The filter assembly includes a filter element and at least one buoyancy element disposed on a bottom of the filter medium. As water flows through the storm water inlet, the water finds its level above the filter medium to provide a liquid feedstock, some of which penetrates the filter medium to create a filtrate. As the tank fills, the filter assembly rises on top of the filtrate as provided by the buoyancy element.

11 Claims, 5 Drawing Sheets

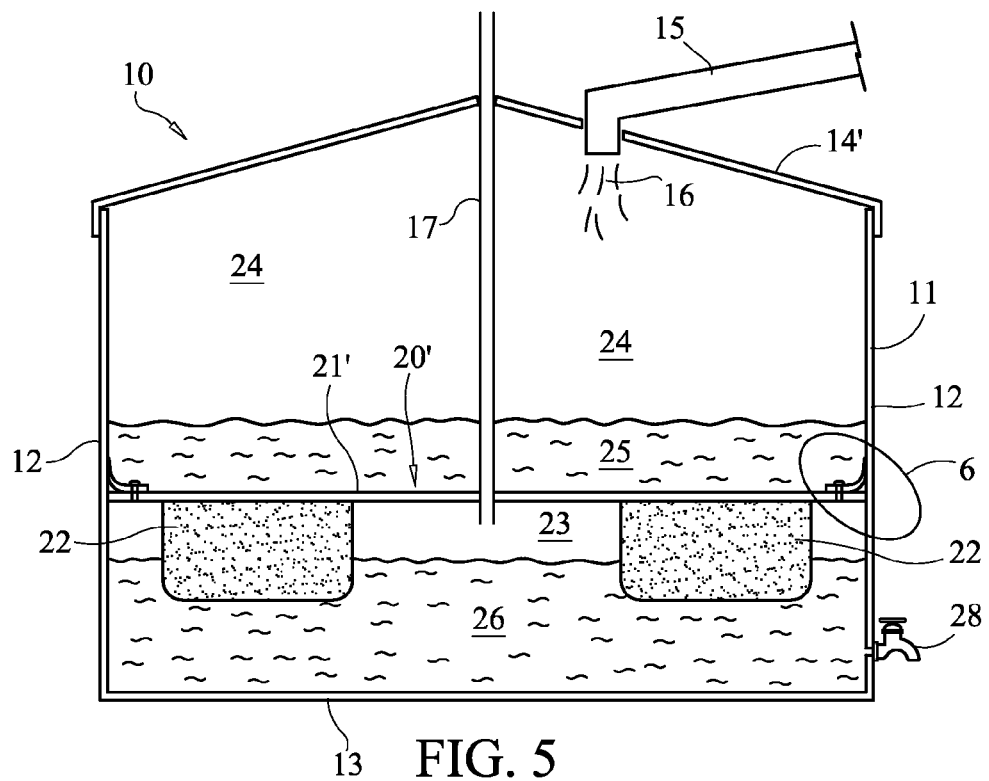
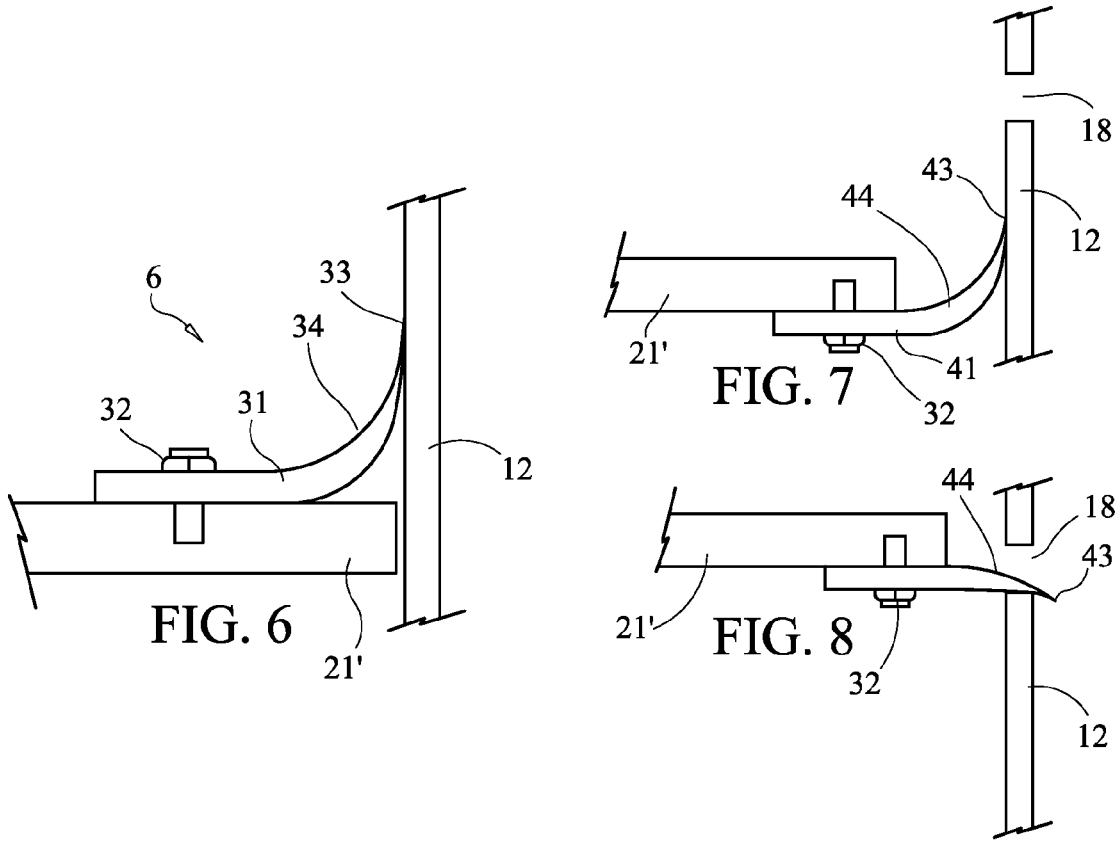

APPARATUS FOR BUOYANCY DRIVEN FILTRATION

CROSS REFERENCE TO RELATED APPLICATIONS

This application is a nonprovisional patent application taking priority from provisional patent application no. 2008903676 filed on Jul. 18, 2008 in Australia.

BACKGROUND OF THE INVENTION

1. Field of the Invention

The present invention relates generally to filtration and more specifically to an apparatus for buoyancy driven filtration, which directly filtrates rain water in a rain water tank.

2. Background of the Prior Art

The scarcity of fresh water, particularly in Australia, has resulted in an increased demand for rain water tanks. However, the quality of the water stored in rain water tanks may be questionable at best, or at worst, a health hazard. Filtration systems have been proposed for purifying water from rain water tanks as it is being used. However, such systems require a filtration flow capacity to be at least that of the demand for the water as it is being used. Additionally, such systems normally require an external energy input, even if derived from environmentally neutral sources, such as wind power.

Accordingly, there is a clearly felt need in the art for an apparatus for buoyancy driven filtration, which alleviates one or more of the problems of the prior art.

SUMMARY OF THE INVENTION

With the foregoing in view, the present invention in one aspect resides broadly in apparatus for buoyancy driven filtration including:

a filtration medium for filtering a liquid feedstock to provide a filtrate filtered through the filtration medium by gravity;

a feedstock containment formation operatively associated with the filtration medium for retaining feedstock in operative contact with the filtration medium for filtration therethrough;

a filtrate containment vessel for containing the filtrate; and buoyancy means buoyant in relation to the filtrate, the buoyancy means being operatively associated with the filtration medium to permit flotation of the filtration medium on or in the filtrate.

Preferably, the feedstock containment formation is formed as a containment vessel for containing liquid to be filtered and having an axis substantially aligned with gravitational acceleration. In such form, the filtration medium divides the containment vessel transverse to the axis and is arranged for movement along the axis. In such form, sealing means is provided in operative disposition between the filtration medium and the containment vessel.

In another aspect the present invention resides broadly in apparatus for buoyancy driven filtration including:

a containment vessel for containing a liquid to be filtered and having an axis substantially aligned with gravitational acceleration;

a filtration medium dividing the containment vessel transverse to and arranged for movement along the axis of the containment vessel whereby the containment vessel is divided into an upper chamber and a lower chamber;

buoyancy means buoyant in relation to the liquid, the buoyancy means being operatively associated with the filtration medium; and sealing means operatively interposed between the filtration medium and the containment vessel whereby the liquid to be filtered may pass through the filtration medium as filtrate from the upper chamber to the lower chamber.

Preferably, sealing means and buoyancy means are operatively associated with the filtration medium to provide a buoyant filtration assembly. In such form, the sealing means operates to maintain sealing against the internal face of the containment vessel despite movement of the buoyant filtration assembly with respect to the containment vessel. Preferably, the buoyant filtration assembly includes alignment means for maintaining operative alignment of the buoyant filtration assembly in order to maintain the sealing thereof against the internal face of the containment vessel.

Preferably, the containment vessel includes inlet means in fluid communication with the upper chamber for receiving liquid to be filtered, whereupon at least some of the liquid passes through to the lower chamber by virtue of the buoyancy of the buoyant filtration assembly acting as a driving force with respect to the liquid in both the upper and lower chambers.

The filtration medium is selected such that liquid may pass therethrough to the lower chamber as filtrate leaving retained species on or in the filtration medium. The retained species may be cleaned off the filtration medium by intervention. However, in a preferred form, the filtration medium is formed such that the upper face slopes towards one or more of the edges of the buoyant filtration assembly. In such form, the containment vessel includes formations arranged to co-operate with the one or more edges of the buoyant filtration assembly such that movement of the buoyant filtration medium brings the one or more edges into operative engagement with the formations. The formations are so arranged that at least some of the liquid to be filtered may be flushed across the upper surface of the filtration medium for a time sufficient to effect removal of at least some of the retained species from the upper face of the filtration medium.

It will be appreciated that the containment vessel may include more than one buoyant filtration assembly and thereby more than two chambers such that successive finer filtration media may be provided in the lower buoyant filtration assemblies. The lower chamber in respect of one buoyant filtration assembly thus may become the upper chamber with respect to the next buoyant filtration below. Outlet means may be provided in each or selected ones of the chambers for drawing of liquid filtrate filtered to various degrees.

In another aspect, the present invention resides broadly in a method of buoyancy driven filtration including:

containing a liquid to be filtered in containment vessel having an axis substantially aligned with gravitational acceleration;

dividing the containment vessel divided into an upper chamber and a lower chamber by a filtration medium buoyant in relation to the liquid;

sealing the upper chamber from the lower chamber;

moving the filtration medium by virtue of said buoyancy whilst maintaining sealing between the chambers, the liquid to be filtered may passing through the filtration medium as filtrate from the upper chamber to the lower chamber.

BRIEF DESCRIPTION OF THE DRAWINGS

In order that the invention may be more readily understood and put into practical effect, a preferred embodiment of the present invention will now described with reference to the following drawings, and wherein:

FIG. 5 is a cross sectional view of an alternative embodiment of an apparatus for buoyancy driven filtration;

FIG. 6 is a cross sectional view of a sealing arrangement of an alternative embodiment of an apparatus for buoyancy driven filtration;

FIG. 7 is a cross sectional view of an alternative sealing arrangement of an alternative embodiment of an apparatus for buoyancy driven filtration;

FIG. 8 is a cross sectional view of an alternative sealing arrangement of an alternative embodiment of an apparatus for buoyancy driven filtration when the apparatus is at or close to capacity;

DETAILED DESCRIPTION OF THE PREFERRED EMBODIMENTS

Figure 1:
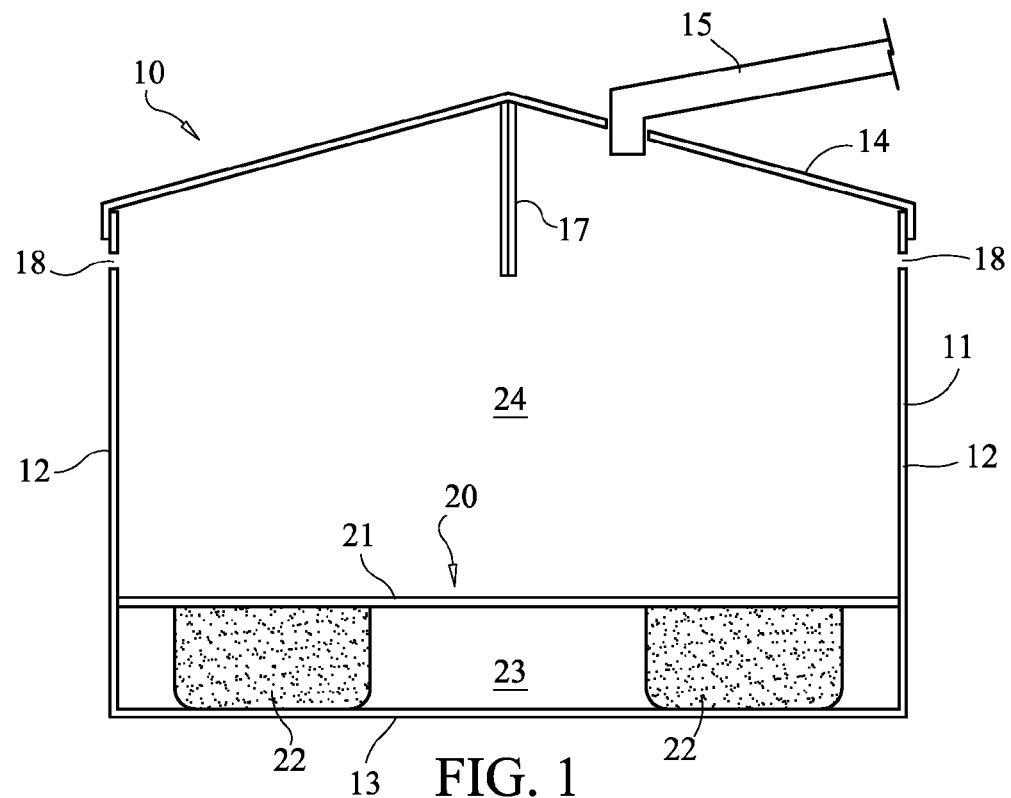
FIG. 1 is a cross sectional view of an apparatus for buoyancy driven filtration without liquid therein.

An apparatus for buoyancy driven filtration is provided as a tank assembly 10 shown in FIGS. 1-4 includes a tank (feedstock containment vessel) 11 having a cylindrical sidewall 12, a circular base wall 13 and a roof 14. The sidewall 12 extends upward from a perimeter of the circular base wall 13. The roof 14 extends across the top of the sidewall 12 to provide a closed container. The roof 14 is of conical form and has a storm water inlet 15 penetrating therethrough, terminating just inside the roof 14.

Figure 2:
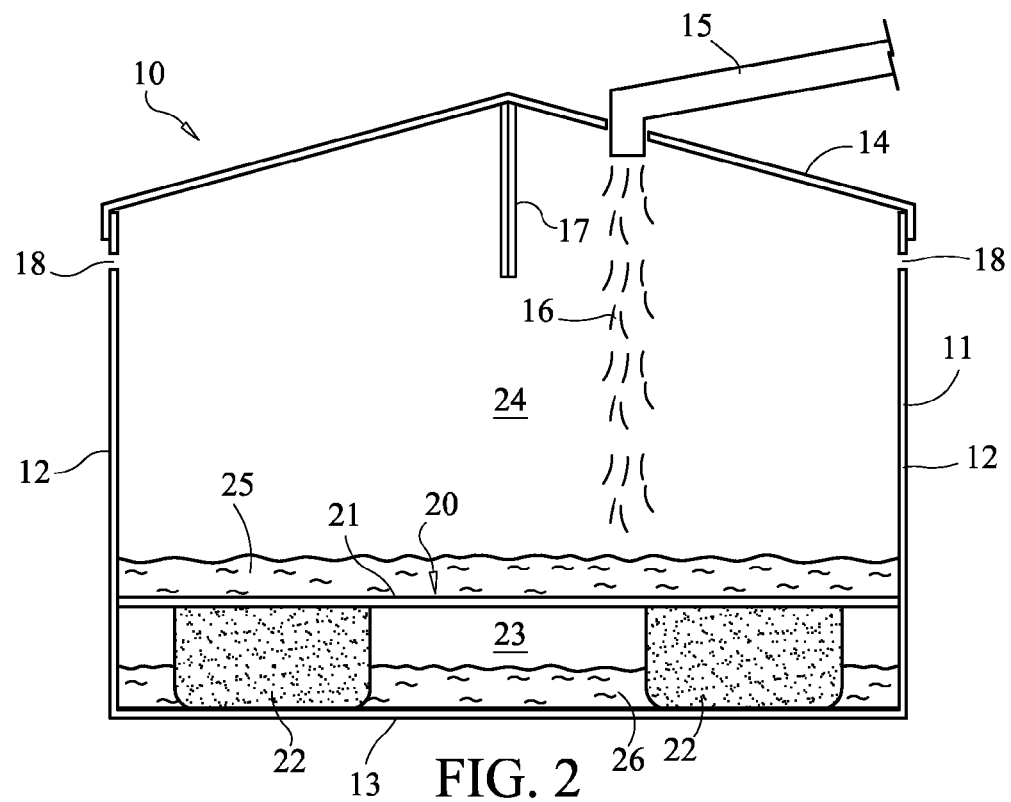
FIG. 2 is a cross sectional view of an apparatus for buoyancy driven filtration with liquid therein being filtered.
Figure 3:
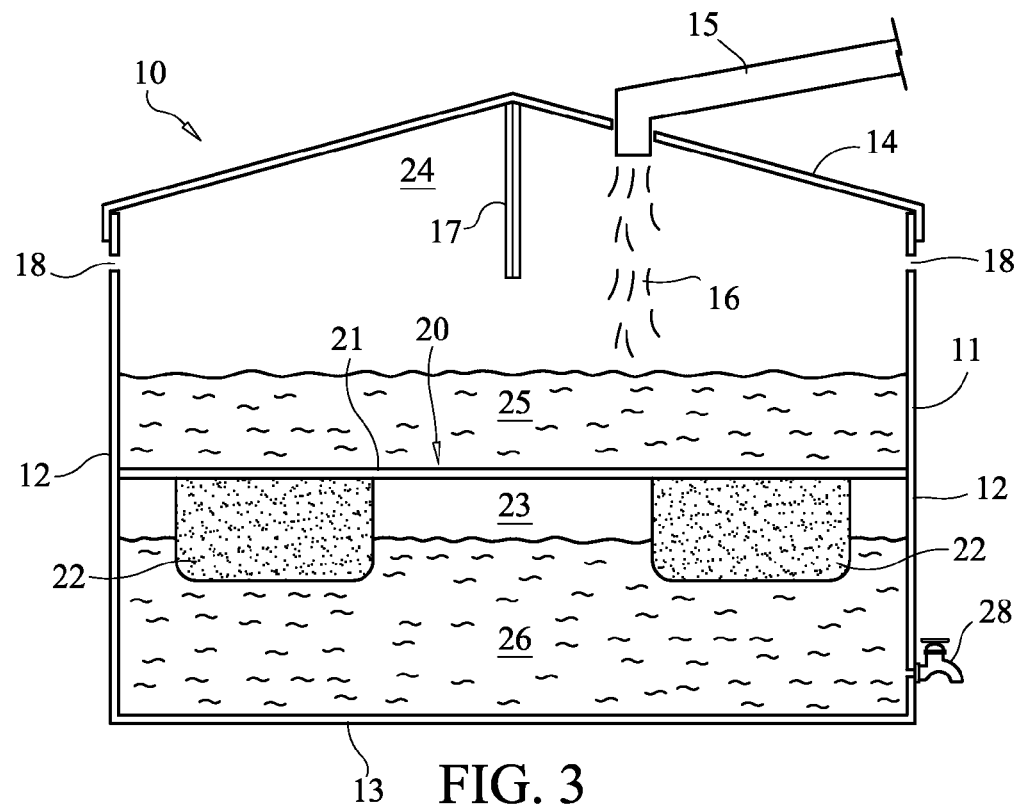
FIG. 3 is a cross sectional view of an apparatus for buoyancy driven filtration with liquid therein and a filter assembly floating therein.
Figure 4:
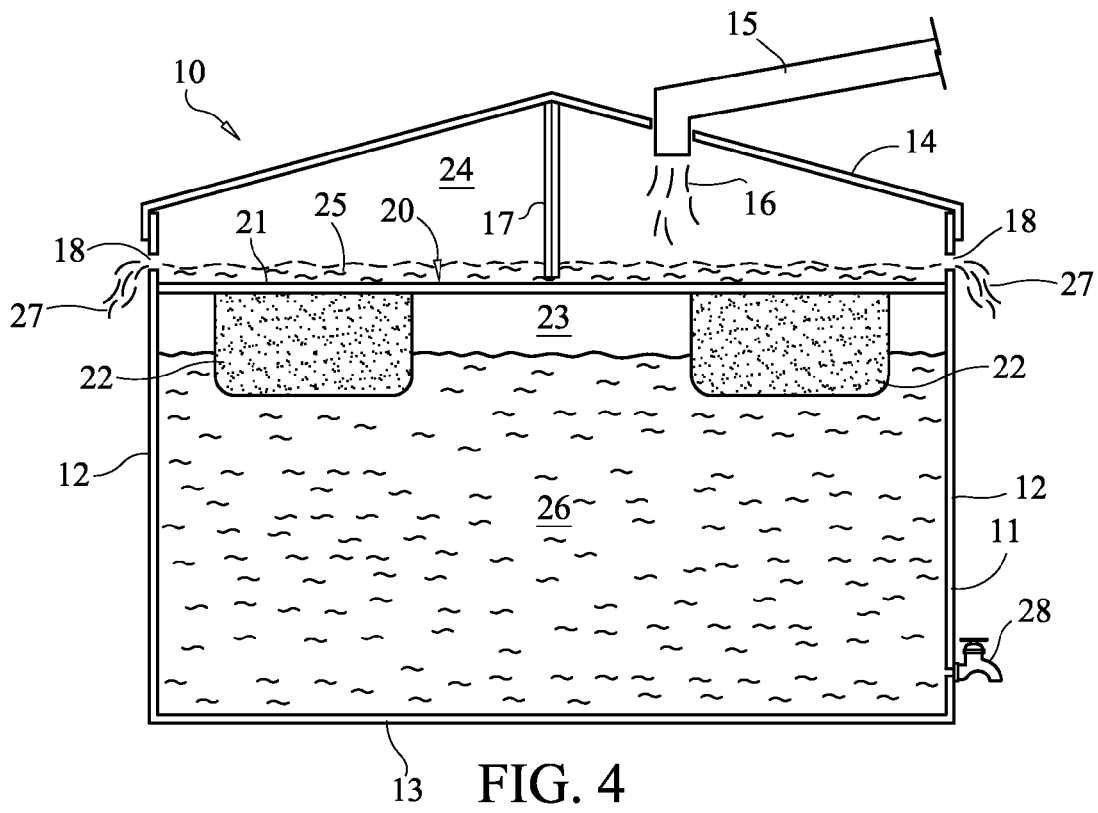
FIG. 4 is a cross sectional view of an apparatus for buoyancy driven filtration filled with liquid.

A travel stop 17 depends downward from the roof 14 to terminate at a predetermined level within the tank 11. The travel stop 17 depends from or passes through an apex of the roof 14. The storm water inlet 15 provides an inflow 16 of liquid feedstock as shown in FIGS. 2-4. FIGS. 1-4 illustrates the tank 11 at progressive stages of filling with water, from empty as shown in FIG. 1 to substantially full as shown in FIG. 4. Two overflow ports 18 are provided in the sidewall 12 at about the same level as the lower end or edge of the travel stop 17.

A filter assembly 20 is provided inside the tank 11 and includes a filter medium 21 extending across the circular cross section of the tank 11. The filter assembly 20 includes a buoyancy element 22 of annular form operatively associated with, such as being fixed to the underside of the filter medium 21. The filter assembly 20 divides the tank 11 into an ullage chamber 24 above the filter medium and a sub-filter plenum chamber 23 below the filter medium. As water flows through the storm water inlet 15 as shown by the inflow 16 in FIGS. 2-4, the water finds its level above the filter medium 21 to provide a feedstock 25, some of which penetrates the filter medium 21 as filtrate 26. The filtrate 26 falls to find is level above the base wall 13 as shown at 26 in FIGS. 2-4. As the tank 11 fills, the filter assembly 20 rises by virtue of its buoyancy in the filtrate 26 as provided by the buoyancy element 22. The filtrate 26 penetrates the filter medium 21 to cause the filter assembly 20 to rise as shown in FIGS. 2 and 3. Once the filter assembly 20 reaches the travel stop 17 as shown in FIG. 4, its upward movement is arrested by the travel stop 17. Such a level is substantially at the same level as the two overflow ports 18, whereby any further inflow can flow out of the tank through the two overflow ports 18 to provide a discharge 27 as shown in FIG. 4. Filtrate 26 may be removed from the tank 11 through a tap 28 shown in FIGS. 3 and 4.

The alternative tank assembly 30 shown in FIG. 5 has a similar arrangement to that shown in FIGS. 1-4, but the travel stop 17 is replaced by a centre post 19, which penetrates through the apex of the roof 14' and the filter medium 21' of the filter assembly 20'.

The filter assembly 20' shown in FIG. 5 includes a sealing element 31 which could be the same kind of sealing arrangement for the tank assembly 10 shown in FIGS. 1-4. The details shown in FIG. 6 illustrate that the sealing element 31 is fastened to the filter medium 21' by a fastener 32 and has a porting lying against the upper face of the filter medium 21'. However, a tapered edge 33 extends partway up the sidewall 12 of the tank 30 through a bend shown at 34. The taped edge 33 permits up and down sliding movement against the inner face of the sidewall 12 of the tank 30 depending on the level of filtrate 26 in the tank 30. The filter assembly 21' riding through the tank 30 by virtue of the buoyancy of the buoyancy element 22 in the filtrate 26 and falling through the tank 30 by virtue of the weight of the filter assembly 20 as the level of filtrate 26 drops in the tank 30 through usage. The tapered edge 33 permits flexing of the sealing element 31 to accommodate roughness or undulation of the inner surface of the sidewall 12. For example, the sidewall 12 may be circumferentially corrugated.

The details shown in FIGS. 7-8 illustrate another alternative sealing element 41 fastened to the filter medium 21' by a fastener 32 and has a porting lying against the lower face of the filter medium 21'. However, a tapered edge 43 extends partway down the sidewall 12 of the tank 30 through a bend shown at 44. The taped edge 43 permits up and down sliding movement against the inner face of the sidewall 12 of the tank 30 depending on the level of filtrate 26 in the tank 30. The filter assembly 21' riding through the tank 30 by virtue of the buoyancy of the buoyancy element 22 in the filtrate 26 and falling through the tank 30 by virtue of the weight of the filter assembly 20 as the level of filtrate 26 drops in the tank 30 through usage. The tapered edge 43 permits flexing of the sealing element 41 to accommodate roughness or undulation of the inner surface of the sidewall 12. For example, the sidewall 12 may be circumferentially corrugated.

Figure 9:
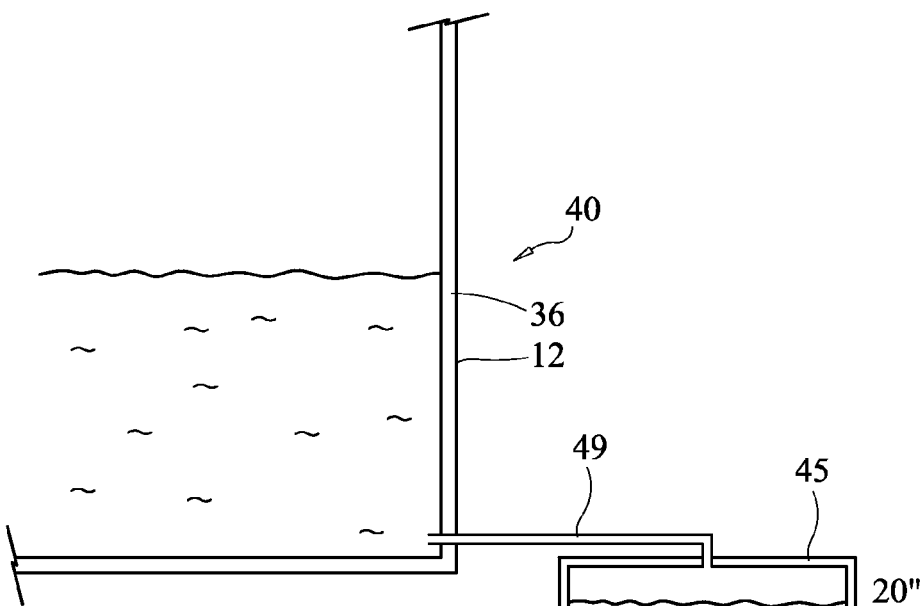
FIG. 9 is a cross sectional view of a second alternative embodiment of an apparatus for buoyancy driven filtration.
Figure 10:
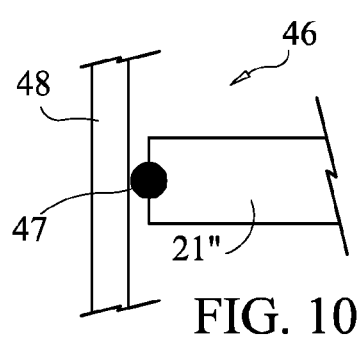
FIG. 10 is an enlarged cross sectional view of a second alternative sealing arrangement of an apparatus for buoyancy driven filtration.

In another alternative tank assembly 40 shown in FIGS. 9 and 10, a separate tank 45 is provided with the filter assembly 20" and operates in every respect in a similar fashion to those shown and described in previous figures. The separate tank 45 is connected to a main tank 36 by way of a feedpipe 49. For convenience, an alternative sealing arrangement is shown in detail 46. An o-ring 47 is embedded in a groove in the outer rim of the filter medium 21" and which can travel up and down the side wall 48 of the separate tank 45 with the filter assembly 20".

Figure 11:
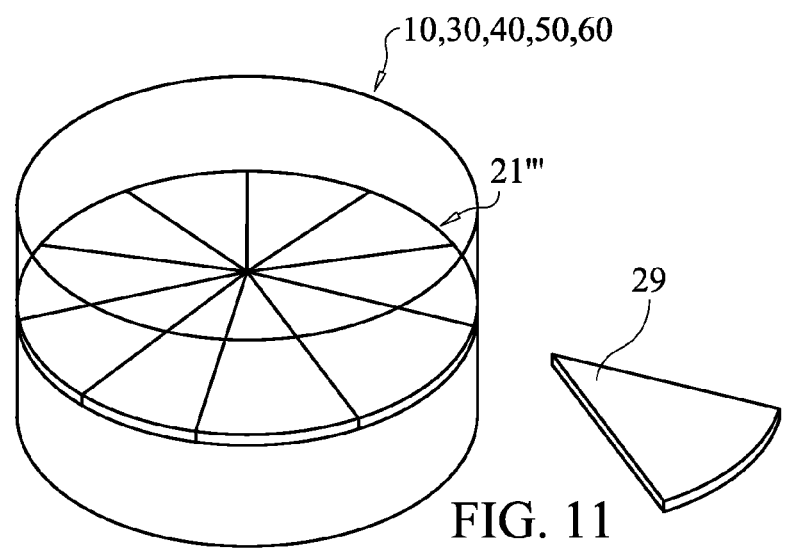
FIG. 11 is a perspective view of a filtration medium divided into ten sections of an apparatus for buoyancy driven filtration.

In the perspective view showing the tank assembles of various forms in FIG. 11, the filter medium 21''' is provided as a full circle of 10 substantially equal segments 29, which may be removed from the tank 10, 30, 40, 50, 60 for cleaning purposes through an access way (not shown). Such an arrangement may be used to replace individual segments 29 should they become blocked or damaged.

Figure 12:
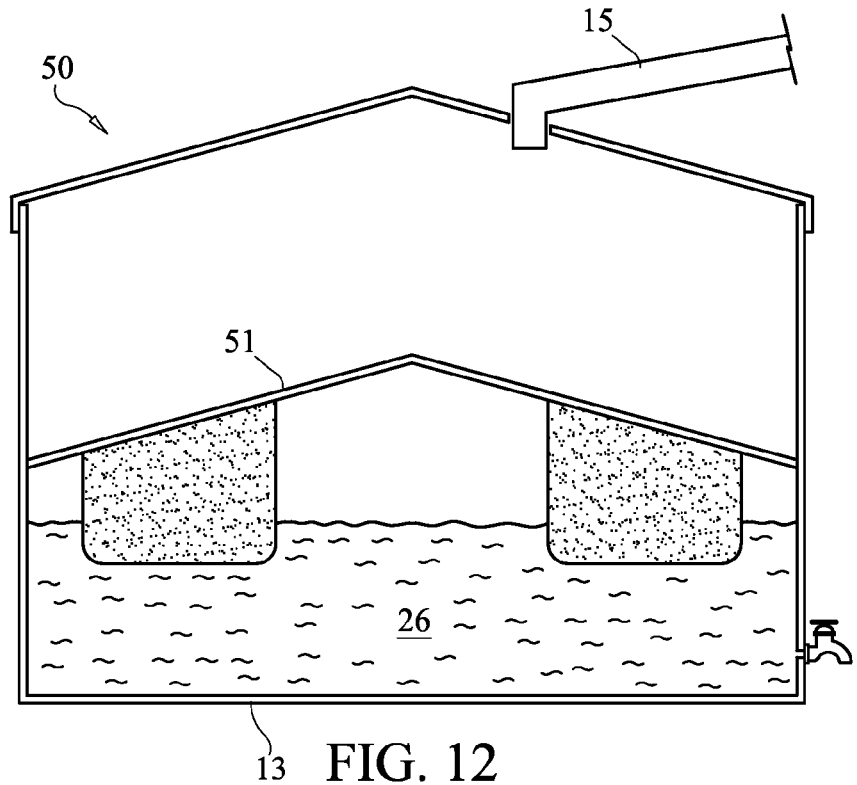
FIG. 12 is a cross sectional view of a third alternative embodiment of an apparatus for buoyancy driven filtration.
Figure 13:
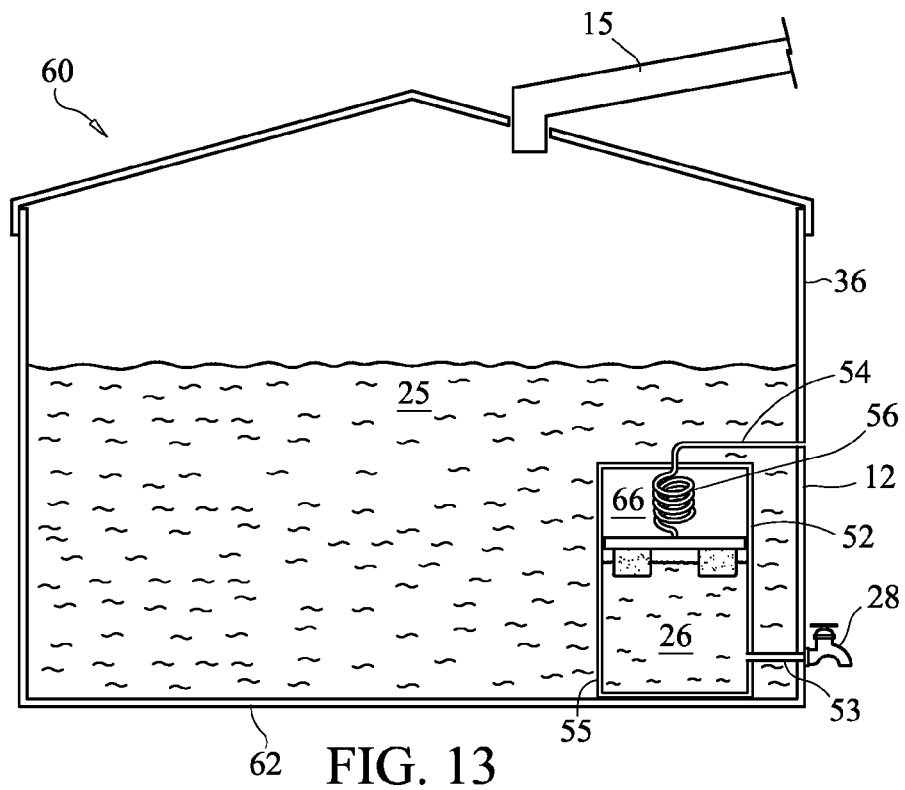
FIG. 13 is a cross sectional view of a fourth alternative embodiment of an apparatus for buoyancy driven filtration.

Two further alternative forms of the tank assembly are shown in FIGS. 12 and 13. In the alternative tank assembly 50 shown in FIG. 12, the filter medium 51 is provided in the form of a conical sheet rather than the flat circular disk shown in the other drawings. In the case of the alternative tank assembly 60 shown in FIG. 13, the apparatus for buoyancy driven filtration is proved in an internal tank 52 provided inside the main tank 60 and resting on the base wall 62. The internal tank 52 is much the same as the apparatus for buoyancy driven filtration described in other forms in the previous twelve figures. However, an inlet pipe 55 provides a fluid connection between the ullage chamber 24 of the internal tank 52 and the feedstock 25 in the main tank 60. Discharge of filtrate 26 is provided through a discharge pipe 53 in fluid connection to the tap 28. An alternative discharge pipe 54 is provided though the main tank 60 to penetrate the sidewall 12 and includes a flexible portion 56 to accommodate the rise and fall of a filter assembly 64 upward and downward through the internal tank 52. The alternative discharge pipe 54 accommodates the circumstance where excess filtrate 26 is produced in the tank 52 below the filter assembly 64, which can occur by virtue of the volume of water 25 in the main tank 60 being somewhat larger than the capacity of the internal tank 52. The ullage chamber 66 is also vented to atmosphere to accommodate changes of volume of the ullage in the internal tank 52.

Apparatus for buoyancy driven filtration in accordance with the invention may be installed at location where stormwater in the form of roof water or ground water is generated by precipitation on a regular basis. Preferred arrangements would have the tank assembly in any one of its alternative forms (or any combination thereof) installed to receive inlet flow storm water by gravity feed, thus making the apparatus of the invention suitable for installation independent of the availability of generated power supply.

The buoyancy element 22 can be of any suitable form which is buoyant in water such as an empty or hollow vessel, but maybe light weight naturally buoyant material such as polystyrene foam or the like. It will be appreciated that when a buoyant material is used, measures may be taken to prevent its saturation and loss of buoyancy by prolonged emersion in water.

Although the invention has been described with reference to a specific example, it will be appreciated by those skilled in the art that the invention may be embodied in other forms within the broad scope and ambit of the invention as herein set forth and provisionally defined by the following claims.

I claim:

1. An apparatus for buoyancy driven filtration including:
   a feedstock containment vessel for retention of a liquid feedstock; and
   a filtering assembly being retained inside said feedstock containment vessel, said filtering assembly including a filtration medium and at least one buoyancy element, said filtration medium filtering the liquid feedstock to provide a filtrate, said at least one buoyancy element causing said filtering assembly to float on the filtrate;
   a travel stop being formed above said filtration assembly for restricting the upward movement of said filtration assembly floating on the filtrate; and
   at least one overflow port being formed through a sidewall of said feedstock containment vessel, said at least one overflow port being formed above said filtration assembly when thereof is against said travel stop.

2. The apparatus for buoyancy driven filtration according to claim 1, further comrprising:
   a seal being formed between a perimeter of said filtration assembly and an inside surface of said feedstock containment vessel.

3. The apparatus for buoyancy driven filtration according to claim 2, further comprising:
   said seal being one of an o-ring and a sealing element.

4. The apparatus for buoyancy driven filtration according to claim 1, further comprising:
   said filtration medium being divided into at least two sections.

5. The apparatus for buoyancy driven filtration according to claim 1, further comprising:
   said feedstock containment vessel being retained in a second feedstock containment vessel.

6. The apparatus for buoyancy driven filtration according to claim 1, further comprising:
   said feedstock containment vessel being supplied with feedstock from a second feedstock containment vessel.

7. The apparatus for buoyancy driven filtration according to claim 1, further comprising:
   said filtration medium having a conical shape.

8. An apparatus for buoyancy driven filtration including:
   a feedstock containment vessel for retention of a liquid feedstock; and
   a filtering assembly being retained inside said feedstock containment vessel, said filtering assembly including a filtration medium and at least one buoyancy element, said filtration medium filtering the liquid feedstock to provide a filtrate, said filtration medium moves along an axis within said feedstock containment vessel that is substantially aligned with a gravitational axis, said at least one buoyancy element causing said filtering assembly to float on the filtrate;
   a travel stop being formed above said filtration assembly for restricting the upward movement of said filtration assembly floating on the filtrate; and
   at least one overflow port being formed through a sidewall of said feedstock containment vessel, said at least one overflow port being formed above said filtration assembly when thereof is against said travel stop.

9. The apparatus for buoyancy driven filtration according to claim 8, further comprising:
   a seal being formed between a perimeter of said filtration assembly and an inside surface of said feedstock containment vessel.

10. An apparatus for buoyancy driven filtration including:
    a feedstock containment vessel for retention of a liquid feedstock; and
    a filtering assembly being retained inside said feedstock containment vessel, said filtering assembly including a filtration medium and at least one buoyancy element, said filtration medium filtering the liquid feedstock to provide a filtrate, said filtration medium moves along an axis within said feedstock containment vessel that is substantially aligned with a gravitational axis, said filtration medium dividing said feedstock containment vessel transverse to the axis, said filtration medium having movement along the axis, said at least one buoyancy element causing said filtering assembly to float on the filtrate;
    a travel stop being formed above said filtration assembly for restricting the upward movement of said filtration assembly floating on the filtrate; and at least one overflow port being formed through a sidewall of said feedstock containment vessel, said at least one overflow port being formed above said filtration assembly when thereof is against said travel stop.

11. The apparatus for buoyancy driven filtration according to claim 10, further comprising:

a seal being formed between a perimeter of said filtration assembly and an inside surface of said feedstock containment vessel.

* * * * *